(12) United States Patent
Ai

(10) Patent No.: US 11,251,514 B2
(45) Date of Patent: Feb. 15, 2022

(54) MULTI-PIECE FASTENER, CONNECTION SYSTEM AND CONNECTION METHOD FOR BASE STATION ANTENNA

(71) Applicant: CommScope Technologies LLC, Hickory, NC (US)

(72) Inventor: Bin Ai, Suzhou (CN)

(73) Assignee: CommScope Technologies LLC, Hickory, NC (US)

(*) Notice: Subject to any disclaimer, the term of this patent is extended or adjusted under 35 U.S.C. 154(b) by 93 days.

(21) Appl. No.: 16/733,467

(22) Filed: Jan. 3, 2020

(65) Prior Publication Data
US 2020/0227809 A1 Jul. 16, 2020

(30) Foreign Application Priority Data
Jan. 11, 2019 (CN) .......................... 201910024916.3

(51) Int. Cl.
*H01Q 1/12* (2006.01)
*H01Q 1/24* (2006.01)
*H01Q 21/00* (2006.01)

(52) U.S. Cl.
CPC ............. *H01Q 1/1207* (2013.01); *H01Q 1/12* (2013.01); *H01Q 1/24* (2013.01); *H01Q 21/00* (2013.01); *H01Q 21/0075* (2013.01)

(58) Field of Classification Search
CPC .... H01Q 1/1207; H01Q 21/0075; H01Q 1/24; H01Q 1/246; H01Q 1/12; H01Q 21/00; F16B 19/08; F16B 19/1081

USPC .......................................................... 343/878
See application file for complete search history.

(56) References Cited

U.S. PATENT DOCUMENTS

| | | | | |
|---|---|---|---|---|
| 5,846,040 A * | 12/1998 | Ueno | ................... | F16B 19/1081 411/45 |
| 5,980,266 A * | 11/1999 | Hsu | ..................... | H01R 13/2421 439/37 |
| 6,048,147 A * | 4/2000 | Arisaka | ................ | F16B 19/1081 411/41 |
| 2010/0171675 A1* | 7/2010 | Borja | ................... | H01Q 9/0414 343/798 |
| 2012/0038540 A1* | 2/2012 | Jacob | ..................... | H01Q 1/246 343/878 |
| 2012/0075155 A1* | 3/2012 | Lindmark | ............ | H01Q 19/106 343/797 |
| 2018/0159200 A1* | 6/2018 | Wang | ....................... | H01Q 1/12 |

* cited by examiner

*Primary Examiner* — Hai V Tran
(74) *Attorney, Agent, or Firm* — Myers Bigel P.A.

(57) ABSTRACT

A multi-piece fastener for mounting a parasitic element to a reflector of a base station antenna comprises first and second elements. The first element or the second element is configured to be anchored on the reflector. The first element is configured to space apart and electrically isolate the parasitic element from the reflector. The first element has a first clamping element, the second element has a second clamping element, and the first clamping element and the second clamping element are configured to clamp the parasitic element therebetween.

22 Claims, 6 Drawing Sheets

MULTI-PIECE FASTENER, CONNECTION SYSTEM AND CONNECTION METHOD FOR BASE STATION ANTENNA

CROSS-REFERENCE TO RELATED APPLICATION

The present application claims priority to Chinese Patent Application Serial No. 201910024916.3, filed Jan. 11, 2019, the entire content of which is incorporated herein by reference.

FIELD

The present invention relates to base station antennas, and more specifically to a multi-piece fastener for mounting a parasitic element to a reflector of a base station antenna, a connection system comprising such a fastener, and a connection method that uses such a fastener.

BACKGROUND

Parasitic elements may be used in a base station antenna to change characteristics of the base station antenna, such as the shape of one or more radiation patterns or "antenna beams" of the base station antenna. The parasitic elements may comprise metal patterns or metal pieces that are mounted near the radiating elements of the base station antenna. The parasitic elements may be effective within a particular frequency range. The parasitic elements may have various sizes and may be constructed in a variety of shapes, such as an L shape, a T shape, a spiral shape, and the like. It may be costly to mount different parasitic elements on a reflector of the base station antenna.

Conventionally, a parasitic element that is implemented as a metal piece that extends forwardly from the reflector may be electrically isolated from the reflector by an insulating gasket. The parasitic element may have, for example, an L-shape with a base that extends parallel to the reflector and a protruding piece that extends forwardly from the reflector that helps shape the radiation pattern. The insulating gasket may be cut to have approximately the same size and the same contour shape as a base of the parasitic element that is connected to the reflector. Due to the wide variety of parasitic elements, a large number of insulating gaskets having different shapes and different sizes are necessary, and an insulating gasket that matches a respective parasitic element has to be selected during the base station antenna assembly process. In addition, the insulating gasket needs to be adhered to the reflector and/or the parasitic element by a tape in a precise relative position.

The insulating gaskets that are used in the prior art are sensitive to metal burrs that can be formed during the stamping process that is used to form one or more holes in the parasitic element that are used in mounting conventional parasitic elements on the reflector. In order to prevent burrs from forming in the openings in the parasitic elements from adversely affecting the insulating gasket and in order to ensure that the parasitic element is electrically isolated from the reflector, an opening in the base of the parasitic element may be stamped into a convex hull in a direction away from the insulating gasket. Forming such a convex hull, however, increases the manufacturing cost and may produce a high stress concentration over an element that is in contact with the convex hull.

FIGS. 1A to 1C illustrate a conventional method of mounting the parasitic element that is discussed above. FIG. 1A shows a reflector 1 of a base station antenna, an insulating gasket 1a that is placed on the reflector 1, and a push rivet that clamps a base of a parasitic element 2 having a hole between the push rivet and the reflector 1. FIGS. 1B and 1C show that the hole in the parasitic element 2 is constructed with a convex hull 2a. With reference to FIG. 1A, the convex hull 2a may be unfavorable to the clamping connection and may cause stress concentration on a female element of the push rivet.

FIG. 1A shows a part of the reflector 1, and FIGS. 1A to 1C show a part of the parasitic element 2. The complete reflector 1 may usually be provided with a plurality of parasitic elements 2 mounted thereon.

SUMMARY

According to a first aspect of the invention, a multi-piece fastener for mounting a parasitic element to a reflector of a base station antenna is provided. The fastener comprises a first element and a second element, where the first element or the second element is configured to be anchored on the reflector. The first element spaces the parasitic element apart from the reflector and electrically isolates the parasitic element from the reflector. The first element has a first clamping element, the second element has a second clamping element, and the first clamping element and the second clamping element are configured to clamp the parasitic element therebetween. The fasteners according to embodiments of the present invention may eliminate the need for an insulating gasket that is used with conventional fasteners. Even when an insulating gasket is used, requirements on the size and shape of the insulating gasket may be reduced, and the insulating gasket may be used to further improve electrical isolation. Additionally, the fasteners may eliminate the need to stamp a convex hull in a hole of the parasitic element, and hence the manufacturing cost may be reduced. It will be appreciated, however, a parasitic element with a convex hull may also be mounted by means of a fastener according to the present invention.

In some embodiments, the first element may have an axial projection that is configured to mate with an opening in the parasitic element.

In some embodiments, the axial projection may be an annular projection. Alternatively, the axial projection may also be configured as a plurality of discrete ring segments or bumps. The hole of the parasitic element may be sleeved on these ring segments or bumps.

In some embodiments, the fastener may be configured as a push rivet. The push rivet including a male element and a female element, where the first element is one of the male element and the female element, and the second element is the other of the male element and the female element.

In some embodiments, the first element may be a female element of the push rivet, and the second element may be a male element of the push rivet. The female element may have a first resilient hollow stem portion and the first clamping element projecting from the first stem portion, where the first stem portion is configured to be inserted into a hole of the reflector, and the first clamping element is configured to rest against the reflector. The male element may have a second stem portion and the second clamping member projecting from the second stem portion, where the second stem portion is configured to be pushed into the first stem portion, such that the first stem portion is radially expanded by the second stem portion and thereby anchored in the hole of the reflector.

In some embodiments, the first clamping element may be configured as a circumferential flange. In other embodiments, the first clamping element may include a plurality of sectors spaced apart from one another in a circumferential direction or a plurality of rod-shaped portions spaced apart from one another in a circumferential direction.

In some embodiments, the second clamping element may be configured as a head of the male element. The head may have a flat bottom surface or an arched bottom surface. In some embodiments, the arched bottom surface may have a circumferential lip, where the lip is configured to contact the parasitic element. In other embodiments, the second clamping element may include a plurality of sectors spaced apart from one another in a circumferential direction or a plurality of rod-shaped portions spaced apart from one another in a circumferential direction.

In some embodiments, the first stem portion may include a plurality of legs, where every two adjacent legs are spaced by a slit. Therefore, the first stem portion can be radially expanded by the second stem portion more easily.

In some embodiments, a locking member may be provided on an inner circumferential surface of the first stem portion, and a counter locking member may be provided on an outer peripheral surface of the second stem portion, where the locking member and the counter locking member are configured to detachably lock the male member and the female member to each other in an axial direction. Thus, the engagement of the first element and the second element may be more robust and durable.

In some embodiments, the first element may be a male element of the push rivet, and the second element may be a female element of the push rivet. The male element may have a first stem portion and the first clamping element projecting from the first stem portion, where the first stem portion is configured to be inserted into a hole of the reflector, and the first clamping element is configured to rest against the reflector. The female element may have a second resilient hollow stem portion and the second clamping member projecting from the second stem portion, where the second stem portion is configured to be pushed and sleeved onto the first stem portion, such that the second stem portion is radially expanded by the first stem portion and thereby anchored in the hole of the reflector.

In some embodiments, the first clamping element may be configured as a head of the male element and the second clamping element may be configured as a head of the female element.

In some embodiments, the second stem portion may include a plurality of legs, where every two adjacent legs are spaced apart from each other in a circumferential direction.

In some embodiments, the second stem portion may include a plurality of legs, where every two adjacent legs are spaced apart from each other in a circumferential direction. A head of the female element may have a plurality of slots, each of which is configured for passage by one of the legs.

In some embodiments, the first element may be a female element, and the second element may be a male element. The female element may have a first resilient hollow stem portion and the first clamping element projecting from the first stem portion, where the first stem portion is configured to be inserted into a hole of the reflector, and the first stem portion has internal threads, and the first clamping element is configured to rest against the reflector. The male element may have a second stem portion and the second clamping member projecting from the second stem portion, where the second stem portion has external threads configured to be screwed into the internal screws, such that the first stem portion is radially expanded by the second stem portion and thereby anchored in the hole of the reflector.

In some embodiments, the first element may have a snap-fit member, where the snap-fit member of the first element is configured to form a snap-fit connection with a hole of the reflector.

In some embodiments, the second element may have a snap-fit member, where the snap-fit member of the second element is configured to form a snap-fit member with the hole of the reflector, or the snap-fit member of the second element is configured to form a snap-fit connection with the first element.

In some embodiments, the second element may be in screwed connection with the first element.

According to a second aspect of the invention, a connection system for a base station antenna is provided. The base station antenna includes a parasitic element and a reflector. A first element or a second element of a multi-piece fastener according to the present invention is anchored on the reflector, where the first element spaces apart and electrically isolates the parasitic element from the reflector. A first clamping element of the first element and a second clamping element of the second element clamp the parasitic element.

A base station antenna may include many such connection systems. Thus, fasteners or connection systems designed according to the present invention may reduce the cost of the base station antenna.

According to a third aspect of the invention, methods for mounting a parasitic element to a reflector of a base station antenna using any of the multi-piece fasteners disclosed herein are provided in which a first element is placed on the reflector. The parasitic element is placed on the first element. A second element is engaged with the first element, such that the parasitic element is clamped between a first clamping element of the first element and a second clamping element of the second element, and such that the parasitic element is spaced apart and electrically isolated from the reflector by the first element.

According to a fourth aspect of the invention, methods for mounting a parasitic element to a reflector of a base station antenna using any of the multi-piece fasteners disclosed herein are provided in which a female element is inserted into a hole of the reflector. The parasitic element is placed on the female element. A male element is pushed into the female element, such that the parasitic element is clamped between a first clamping element of the female element and a second clamping element of the male element, and such that the parasitic element is spaced apart and electrically isolated from the reflector by the first clamping element of the female element.

It is also to be noted here that, various technical features mentioned in the present application, even if they are recited in different paragraphs of the description or described in different embodiments, may be combined with one another randomly, as long as these combinations are technically feasible. All of these combinations are the technical contents recited in the present application.

DETAILED DESCRIPTION

Figure 1A:
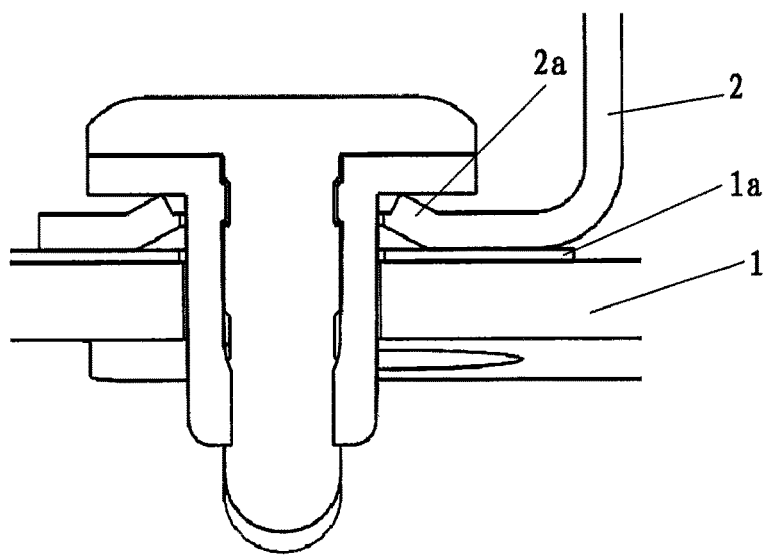
FIG. 1A is a sectional view of a connection system for a prior art base station antenna.
Figure 1B:
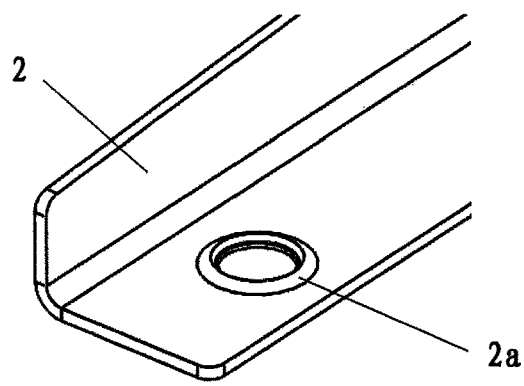
FIGS. 1B and 1C are enlarged partial perspective views of a parasitic element of the connection system of FIG. 1A, as viewed from two different angles.
Figure 1C:
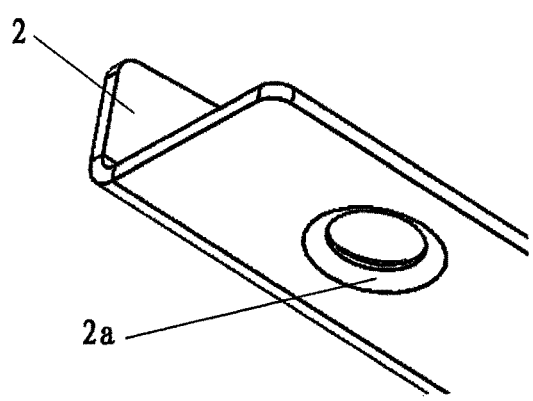
Figure 2A:
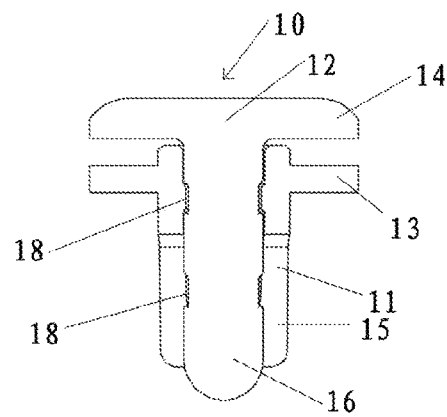
FIGS. 2A, 2B and 2C are sectional, perspective and exploded views, respectively, of a two-piece fastener in accordance with an embodiment of the present invention.
Figure 2B:
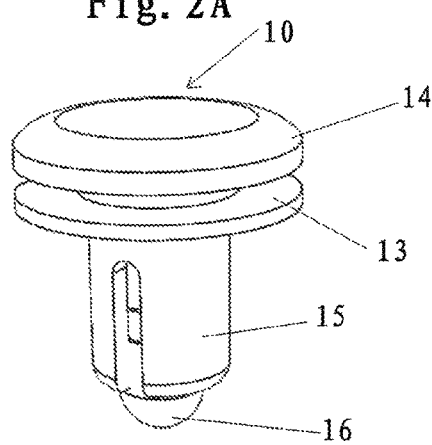
Figure 2C:
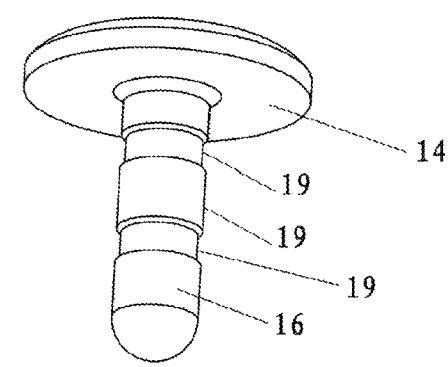
Figure 2C:
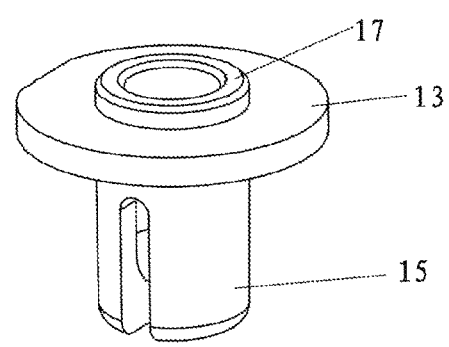
Figure 3:
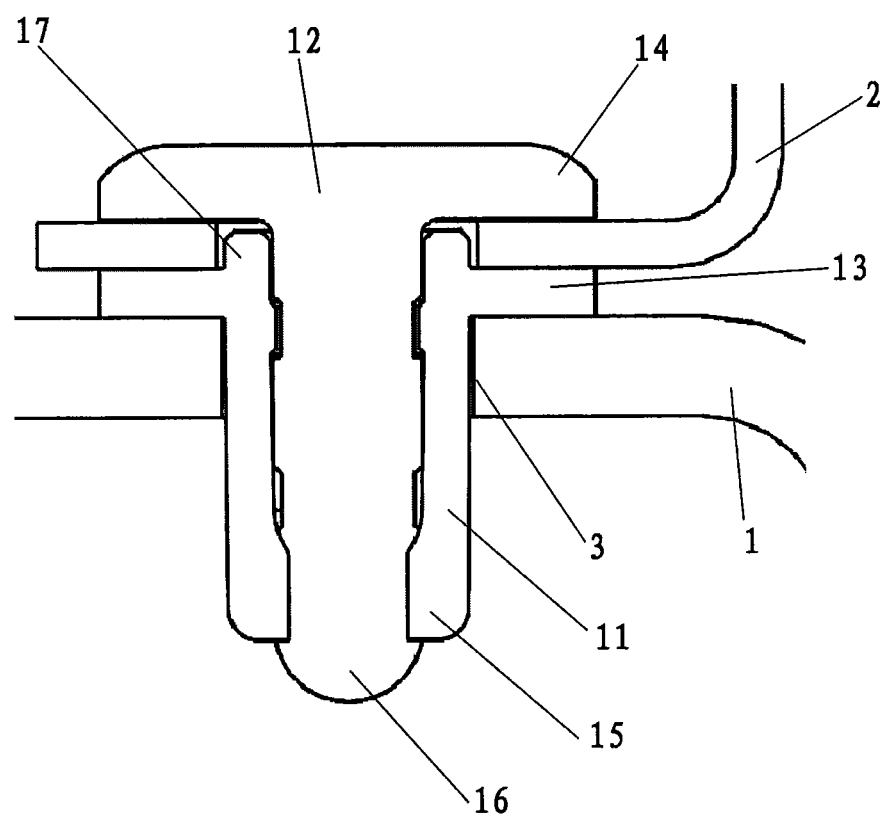
FIG. 3 is a sectional view of a connection system comprising the fastener in FIG. 2.

FIGS. 2A-2C illustrate a two-piece fastener 10 for mounting a parasitic element 2 to a reflector 1 of a base station antenna in accordance with an embodiment of the present invention. FIG. 3 is a sectional view of a connection system comprising the same.

In the example embodiment illustrated in FIGS. 2A-3, the fastener 10 comprises a first element 11 and a second element 12. The first element 11 is configured to be anchored on the reflector 1. The first element 11 is configured to space the parasitic element 2 from the reflector 1 and to electrically isolate the parasitic element 2 from the reflector 1. The first element 11 has a first clamping element 13, the second element 12 has a second clamping element 14, and the first clamping element 13 and the second clamping element 14 are configured to clamp the parasitic element 2 therebetween.

Here, the fastener 10 is configured as a push rivet, where the first element 11 is a female element of the push rivet, and the second element 12 is a male element of the push rivet. The female element has a first resilient hollow stem portion 15. The first clamping element 13 projects from the first stem portion 15. The first stem portion 15 is configured to be inserted into a hole 3 (see FIG. 3) of the reflector 1, and the first clamping element 13 is configured to rest against the reflector 1. The male element has a second stem portion 16. The second clamping member 14 projects from the second stem portion 16. The second stem portion 16 is configured to be pushed into the first stem portion 15, such that the first stem portion 15 is radially expanded by the second stem portion 16 and thereby anchored in the hole 3 of the reflector 1.

Here, the first clamping element 13 is configured as a circumferential flange, and the second clamping element 14 is configured as a head of the male element. The first element 11 has an axial projection 17 configured to position the parasitic element 2. The axial projection 17 is configured as an annular projection.

In order to enable the first stem portion 15 to more readily be radially expanded by the second stem portion 16, the first stem portion 15 may include a plurality of legs such as, for example, two legs. Adjacent legs are spaced apart by a slit. One of the two axial slits can be seen in FIGS. 2B and 2C.

Here, a locking member 18 is provided on an inner circumferential surface of the first stem portion 15, and a counter locking member 19 is provided on an outer peripheral surface of the second stem portion 16, where the locking member 18 and the counter locking member 19 are configured to detachably lock the male member and the female member to each other in an axial direction. Thus, the engagement of the first element 11 and the second element 12 can be more robust and durable. The locking member 18 and the counter locking member 19 may be constructed to be a ring groove and a ring shoulder that are mated with each other.

FIG. 3 illustrates a connection system which includes the fastener 10 as shown in FIGS. 2A-2C. A reflector 1 and an L-shaped parasitic element 2 are partially illustrated in FIG. 3. The reflector 1 has a plurality of holes 3 formed therein, one of which is shown in FIG. 3. The first element 11 is first loosely inserted into the hole 3. Then, the parasitic element 2 is positioned on the axial projection 17 of the first element 11, and then the second element 12 is inserted into the first element 11. At this time, the stem portion 16 causes the stem portion 15 to expand radially and thus causes the stem portion 15 to be anchored in the hole 3 of the reflector 1. The parasitic element 2 is clamped between the first clamping element 13 of the first element 11 and the second clamping element 14 of the second element 12. The parasitic element 2 is spaced apart and electrically isolated from the reflector 1 by the first clamping element 13. The second clamping element 14 has a flat bottom surface, and the axial projection 17 has a height that is less than a height of the parasitic element 2. In the connection system in FIG. 3, the insulating gasket 1a and the convex hull 2a that are used in the prior art mounting technique may be omitted.

Figure 4:
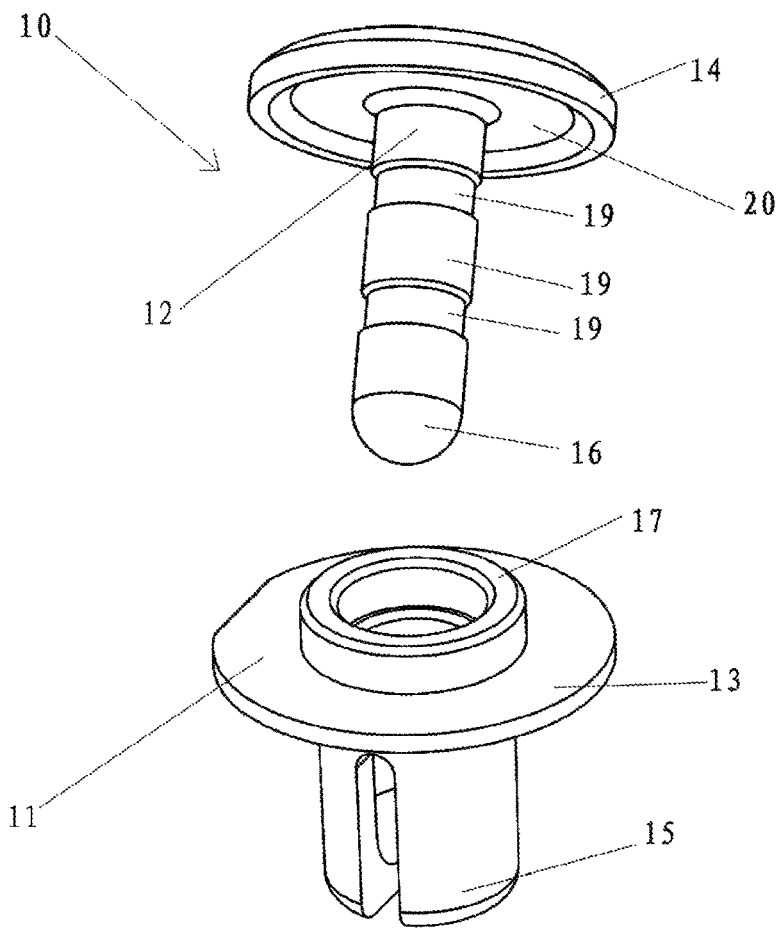
FIG. 4 is an exploded view of a fastener in accordance with another embodiment of the present invention.
Figure 5:
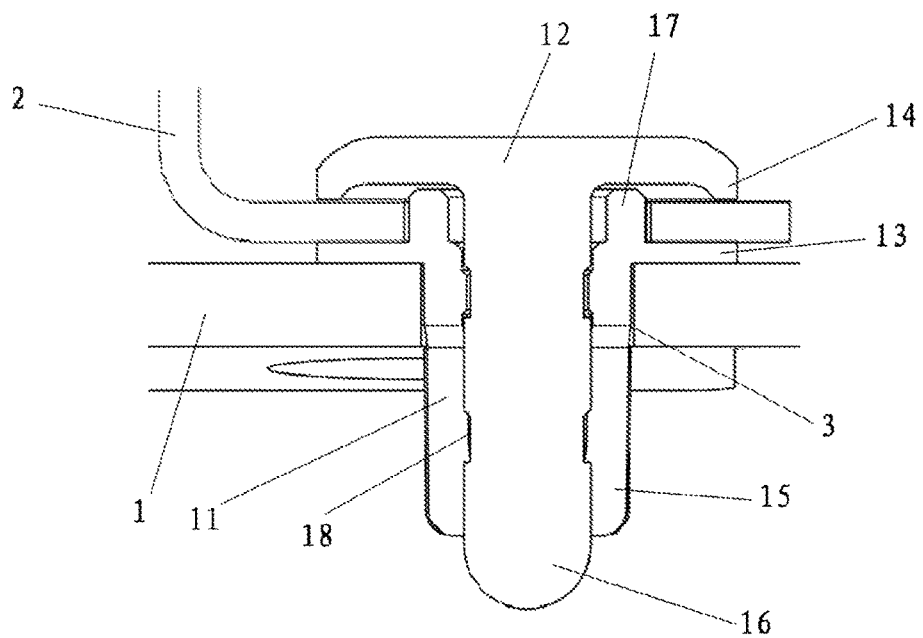
FIG. 5 is a cross-sectional view of a connection system comprising the fastener of FIG. 4.

FIG. 4 is an exploded view of a fastener 10 in accordance with another embodiment of the present invention, and FIG. 5 is a sectional view of a connection system comprising the fastener 10 of FIG. 4.

The embodiment according to FIG. 4 differs from the embodiment according to FIGS. 2A to 2C mainly in that a head of a male element of the push rivet has an arched bottom surface. The female elements in the two embodiments may be the same or similar. Here, the head of the male element has a central depression 20 and a downwardly extending lip that extends around the outer edge of the head, where the lip has an annular surface for contact with a parasitic element 2. As described above, the female element has an annular projection 17. However, the annular projection in this embodiment may have a height greater than a thickness of the parasitic element 2. In other aspects, reference may be made to the description of the embodiments as shown in FIGS. 2A-2C and FIG. 3.

It will be appreciated that many modifications may be made to the example embodiments shown in FIGS. 2A to 2C and FIG. 4. For example, in other embodiments, the locking member 18 of the first stem portion and the counter locking member 19 of the second stem portion may be omitted, and the first stem portion 15 may be provided with internal threads, while the second stem portion 16 may be provided with external threads. By screwing the external threads into the internal threads, the first element 11 and the second element 12 can be engaged with each other, and the first stem portion 15 can be radially expanded by the second stem portion 16 and thus can be anchored in the hole 3 of the reflector 1.

In still other embodiments that are not shown, a first element may have a snap-fit member. When installed, firstly, the first element may form a snap-fit connection with a hole 3 of a reflector 1 with the aid of a snap-fit member of the first element. A parasitic element 2 may be then placed on the first element, for example may be positioned on an axial protrusion of the first element. Then, a second element may form a snap-fit connection with the hole 3 of the reflector 1 or with the first element with the aid of a snap-fit member of the second element. The first element may space the parasitic element 2 apart from the reflector 1 and electrically isolate the parasitic element 2 from the reflector 1. The parasitic element 2 is clamped between the first element and the second element, and more specifically, clamped between a first clamping element of the first element and a second clamping element of the second element. It will also be appreciated that the second element may be in screwed connection with a first element in still other embodiments.

Figure 6A:
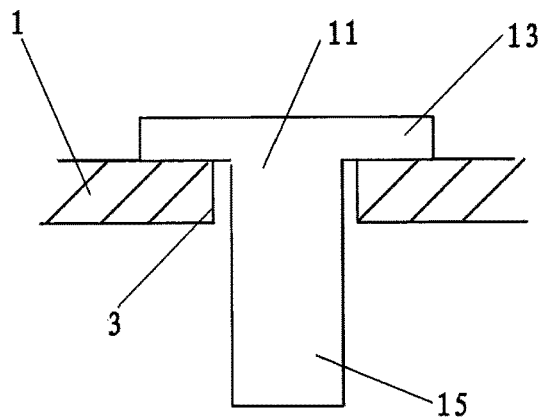
FIGS. 6A-6D are schematic views of a fastener and a connection system according to another embodiment of the present invention.
Figure 6B:
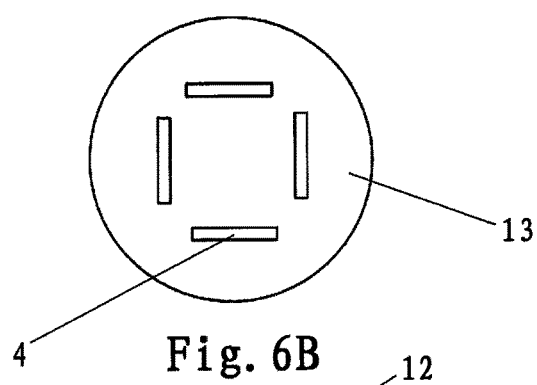

FIGS. 6A-6D are schematic views of a fastener and a connection system according to another embodiment of the present invention. The fastener is in two pieces and is configured as a push rivet. FIG. 6A illustrates, in a schematic sectional view, a first element 11 of the push rivet, which is loosely inserted into a hole 3 of a reflector 1. FIG. 6B is a schematic top view of the first element 11. The first element 11 is configured as a male element having a first stem portion 15 and a head, where the head forms a first clamping element 13 and has a plurality of slots 4, for example four slots.

Figure 6C:
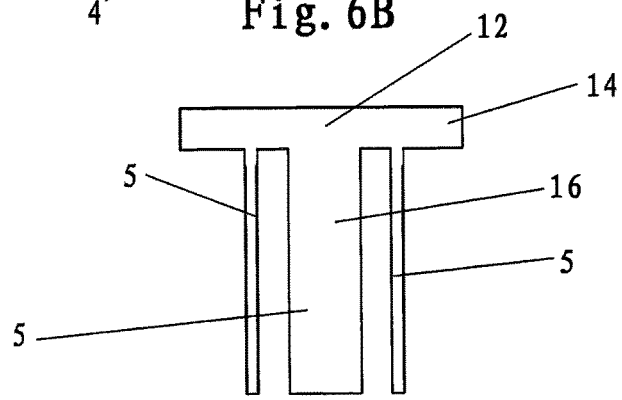

FIG. 6C illustrates, in a schematic side view, a second element 12 of the push rivet. The second element 12 has a head that forms a second clamping element 14. A plurality of legs 5, for example four legs, project downwardly from the head of the second element 12. In FIG. 6C, there may be seen three of the four legs 5, and the other leg 5 is shielded by the middle leg 5. The legs 5 are spaced apart from one another in a circumferential direction and commonly form a second resilient hollow stem portion 16 of the second element 12.

Figure 6D:
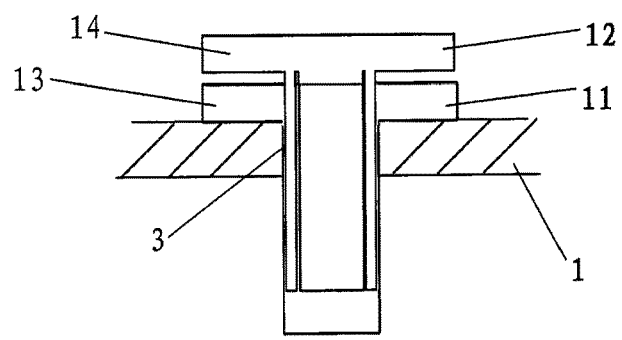

FIG. 6D illustrates an engagement state of the first element 11 and the second element 12 of the fastener 10. Here, the legs 5 of the second stem portion 16 pass through the respective slots 4 of the first element 11, and the second stem portion 16 is radially expanded by the first stem portion 15, and thus the second stem portion 16 is anchored in the hole 3 of the reflector 1. A parasitic element 2 clamped between the first element 11 and the second element 12 isn't shown for the sake of simplicity. While not shown in the drawings, the first element 11 may have an axial projection such as the axial projection 17 of the push rivet of FIGS. 2A-2C. This axial projection may be configured to allow the parasitic element to be mounted a proper position before the second element 12 is engaged with the first element 11.

FIGS. 7A-7E are bottom views of multiple variants of second elements 12 that may be included in push rivets according to embodiments of the present invention. The design of the corresponding first elements 11 of the push rivets that would mate with the second elements 12 illustrated in FIGS. 7A-7E will be apparent in light of the teachings of the present disclosure.

Figure 7A:
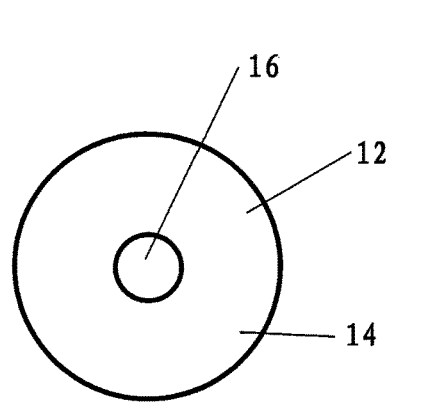
FIGS. 7A-7E are bottom views of multiple variants of second elements of fasteners according to embodiments of the present invention.
Figure 7B:
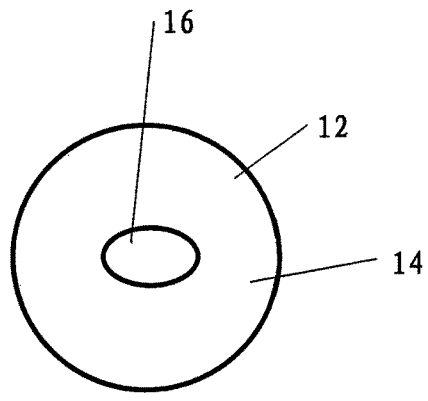
Figure 7C:
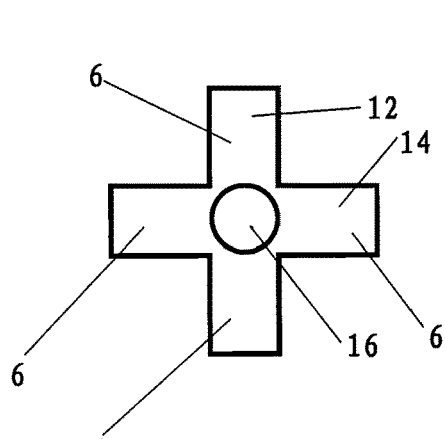
Figure 7D:
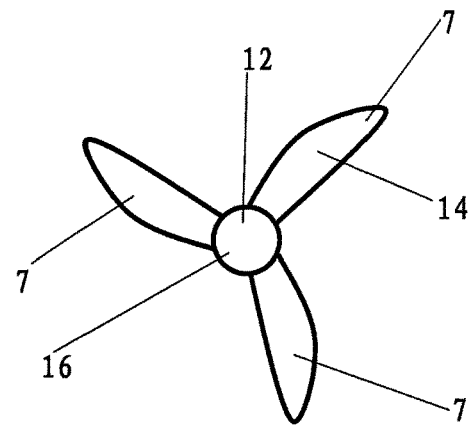
Figure 7E:
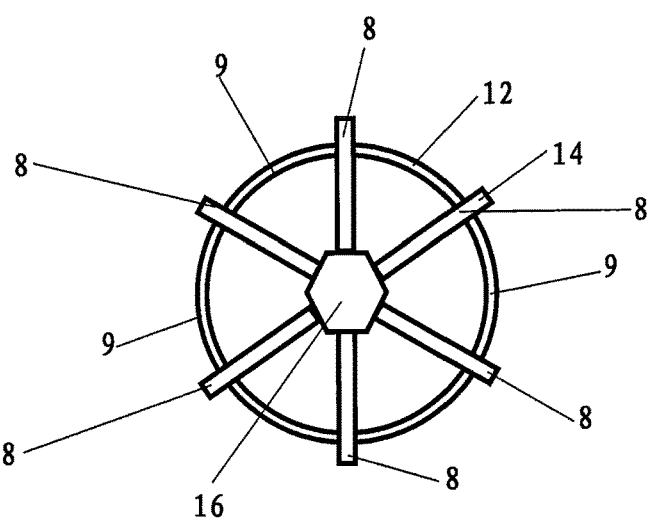

In FIG. 7A, a second clamping element 14 of the second element 12 is constructed in a circular disc shape, and a stem portion 16 of the second element 12 has a circular cross section. In FIG. 7B, a second clamping element 14 of the second element 12 is constructed in a circular disc shape, and a stem portion 16 of the second element 12 has an elliptical cross section. In FIG. 7C, a second clamping element 14 of the second element 12 is constructed in a cross shape including four arms 6, and a stem portion 16 of the second element 12 has a circular cross section. In FIG. 7D, a second clamping element 14 of the second element 12 includes three blade elements 7, and a stem portion 16 of the second element 12 has a circular cross section. In FIG. 7E, a second clamping element 14 of the second element 12 includes six rod-shaped elements 8, which are connected to each other radially outside by arc-shaped elements 9, and a stem portion 16 of the second element 12 has a hexagonal cross section. Aspects of the above-described second elements may be mixed and matched to provide many additional embodiments, and many other embodiments will be apparent in light of the present disclosure.

In some embodiments which are not shown, first clamping elements 11 may be constructed in view of the above variants of the second clamping elements 12. In some example embodiments, a first element 11 may include six rod-shaped elements. In some embodiments, all of the rod-shaped elements are configured not only to rest against a reflector 1 but also to be in contact with a parasitic element 2. It will be appreciated, however, three of the rod-shaped elements are configured to rest against a reflector 1 without contact with a parasitic element 2, while the other three rod-shaped elements are configured to be in contact with the parasitic element 2 without resting against the reflector 1, in some other embodiments.

While the above-description focuses on two-piece fasteners, it will be appreciated that the fasteners according to embodiments of the present invention may include more than two pieces in some embodiments. For example, either the first elements 11 and/or the second elements 12 described above could be divided into two separate elements in some embodiments to provide three or four piece fasteners. As one simple example, the axial projection 17 could be omitted from the first element 11 and replaced with an opening, a third element that includes the axial projection and a stem could be provided, and the stem could be mounted in the opening to mount the third element on the first element 11. Such an embodiment would comprise a three-piece push rivet where the first element 11 is implemented as a two-piece element.

It is to be noted that, the terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprise" and "include" (and variants thereof), when used in this specification, specify the presence of stated operations, elements, and/or components, but do not preclude the presence or addition of one or more other operations, elements, components, and/or groups thereof. As used herein, the term "and/or" includes any and all combinations of one or more of the associated listed items. Like reference numbers signify like elements throughout the description of the figures.

The thicknesses of elements in the drawings may be exaggerated for the sake of clarity. Further, it will be understood that when an element is referred to as being "on," "coupled to" or "connected to" another element, the element may be formed directly on, coupled to or connected to the other element, or there may be one or more intervening elements therebetween. In contrast, terms such as "directly on," "directly coupled to" and "directly connected to," when used herein, indicate that no intervening elements are present. Other words used to describe the relationship between elements should be interpreted in a like fashion (i.e., "between" versus "directly between", "attached" versus "directly attached," "adjacent" versus "directly adjacent", etc.).

Terms such as "top," "bottom," "upper," "lower," "above," "below," and the like are used herein to describe the relationship of one element, layer or region to another element, layer or region as illustrated in the figures. It will be understood that these terms are intended to encompass different orientations of the device in addition to the orientation depicted in the figures.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive concept.

It will also be appreciated that all example embodiments which are disclosed herein can be combined in any way.

Finally, it is to be noted that, the above-described embodiments are merely for understanding the present invention but not constitute a limit on the protection scope of the present invention. For those skilled in the art, modifications may be made on the basis of the above-described embodiments, and these modifications do not depart from the protection scope of the present invention.

That which is claimed is:

1. A multi-piece fastener for mounting a parasitic element to a reflector of a base station antenna, comprising:
    a first element having a first clamping element; and
    a second element having a second clamping element;
    wherein the first element is configured to anchor on the reflector,
    wherein the first element is configured to space apart and electrically isolate the parasitic element from the reflector,
    wherein the first clamping element and the second clamping element are configured to clamp the parasitic element between the first clamping element and the second clamping element,
    wherein a portion of the parasitic element that is received between the first clamping element and the second clamping element extends in parallel to the reflector, and
    wherein the parasitic element is configured to change a shape of a radiation pattern of the base station antenna,
    wherein the first element has a first resilient hollow stem portion and the first clamping element projecting from the first stem portion, wherein the first stem portion is configured to insert into a hole of the reflector, and the first clamping element is configured to rest against the reflector.

2. The multi-piece fastener according to claim 1, wherein the first element has an axial projection that is configured to mate with an opening in the parasitic element.

3. The multi-piece fastener according to claim 2, wherein the axial projection is an annular projection.

4. The multi-piece fastener of claim 1, wherein the first element is a female element, and the second element is a male element;
    the first stem portion has internal threads; and
    the male element has a second stem portion and the second clamping member projecting from the second stem portion, wherein the second stem portion has external threads configured to screw into the internal threads, such that the first stem portion is radially expanded by the second stem portion and thereby anchored in the hole of the reflector.

5. The multi-piece fastener of claim 1, wherein the first element has a snap-fit member, wherein the snap-fit member of the first element is configured to form a snap-fit connection with a hole of the reflector.

6. The multi-piece fastener of claim 1, wherein the second element has a snap-fit member, wherein the snap-fit member of the second element is configured to form a snap-fit connection with a hole of the reflector, or the snap-fit member of the second element is configured to form a snap-fit connection with the first element.

7. The multi-piece fastener of claim 1, wherein the second element is in screwed connection with the first element.

8. A connection system, comprising the parasitic element, a reflector and the multi-piece fastener of claim 1,
    wherein the first element or the second element of the fastener is anchored on the reflector, the first element spaces apart and electrically isolate the parasitic element from the reflector, and the first clamping element of the first element and the second clamping element of the second element clamp the parasitic element.

9. A method for mounting the parasitic element to the reflector of the base station antenna using multi-piece fastener of claim 1, comprising the steps of:
    placing the first element on the reflector;
    placing the parasitic element on the first element; and
    engaging the second element with the first element, such that the parasitic element is clamped between the first clamping element of the first element and the second clamping element of the second element, and such that the parasitic element is spaced apart and electrically isolated from the reflector by the first element.

10. The multi-piece fastener according to claim 1, wherein a portion of the second element is received within an opening in the first element.

11. A multi-piece fastener for mounting a metal element to a reflector of a base station antenna, comprising:
    a first element having a first clamping element; and
    a second element having a second clamping element;
    wherein the first element is configured to anchor on the reflector,
    wherein the first element is configured to space apart and electrically isolate the structure metal element from the reflector,
    wherein the first clamping element and the second clamping element are configured to clamp the metal element between the first clamping element and the second clamping element, and
    wherein the fastener is configured as a push rivet including a male element and a female element, wherein the first element is one of the male element and the female element, and the second element is the other of the male element and the female element.

12. The multi-piece fastener according to claim 11, wherein the first element is the female element and has a first resilient hollow stem portion and the first clamping element projecting from the first stem portion, wherein the first stem portion is configured to be inserted into a hole of the reflector, and the first clamping element is configured to rest against the reflector.

13. A multi-piece fastener for mounting a metal element to a reflector of a base station antenna, comprising:
    a first element having a first clamping element; and
    a second element having a second clamping element;
    wherein the first element is configured to anchor on the reflector,
    wherein the first element is configured to space apart and electrically isolate the metal element from the reflector,
    wherein the first clamping element and the second clamping element are configured to clamp the metal element between the first clamping element and the second clamping element
    wherein the fastener is configured as a push rivet, wherein the first element is a female element of the push rivet, and the second element is a male element of the push rivet;

the female element has a first resilient hollow stem portion and the first clamping element projecting from the first stem portion, wherein the first stem portion is configured to insert into a hole of the reflector, and the first clamping element is configured to rest against the reflector; and the male element has a second stem portion and the second clamping member projecting from the second stem portion, wherein the second stem portion is configured to push into the first stem portion, such that the first stem portion is radially expanded by the second stem portion and thereby anchored in the hole of the reflector.

14. The multi-piece fastener of claim 13, wherein the first clamping element is configured as a circumferential flange.

15. The multi-piece fastener of claim 13, wherein the second clamping element is configured as a head of the male element.

16. The multi-piece fastener of claim 15, wherein the head has an arched bottom surface that has a circumferential lip, wherein the lip is configured to contact the metal element.

17. The multi-piece fastener according to claim 13, wherein the first stem portion includes a plurality of legs, wherein every two adjacent legs are spaced by a slit.

18. The multi-piece fastener of claim 13, wherein a locking member is provided on an inner circumferential surface of the first stem portion, and a counter locking member is provided on an outer peripheral surface of the second stem portion, wherein the locking member and the counter locking member are configured to detachably lock the male member and the female member to each other in an axial direction.

19. A multi-piece fastener for mounting a metal element to a reflector of a base station antenna, comprising:

a first element having a first clamping element; and
a second element having a second clamping element;
wherein the first element is configured to anchor on the reflector,
wherein the first element is configured to space apart and electrically isolate the metal element from the reflector,
wherein the first clamping element and the second clamping element are configured to clamp the metal element between the first clamping element and the second clamping element,
wherein the fastener is configured as a push rivet, wherein the first element is a male element of the push rivet, and the second element is a female element of the push rivet;

the male element has a first stem portion and the first clamping element projecting from the first stem portion, wherein the first stem portion is configured to be inserted into a hole of the reflector, and the first clamping element is configured to rest against the reflector; and the female element has a second resilient hollow stem portion and the second clamping member projecting from the second stem portion, wherein the second stem portion is configured to be pushed and sleeved onto the first stem portion, such that the second stem portion is radially expanded by the first stem portion and thereby anchored in the hole of the reflector.

20. The multi-piece fastener of claim 19, wherein the first clamping element is configured as a head of the male element and the second clamping element is configured as a head of the female element.

21. The multi-piece fastener of claim 20, wherein the second stem portion includes a plurality of legs, wherein every two adjacent legs are spaced apart from each other in a circumferential direction, and the head of the female element has a plurality of slots, each of which is configured for passage by one of the legs.

22. The multi-piece fastener of claim 19, wherein the second stem portion includes a plurality of legs, wherein every two adjacent legs are spaced apart from each other in a circumferential direction.

* * * * *

UNITED STATES PATENT AND TRADEMARK OFFICE
CERTIFICATE OF CORRECTION

PATENT NO. : 11,251,514 B2
APPLICATION NO. : 16/733467
DATED : February 15, 2022
INVENTOR(S) : Bin Ai It is certified that error appears in the above-identified patent and that said Letters Patent is hereby corrected as shown below:

In the Claims

Column 10, Line 34, Claim 11:
Please correct "the structure metal element" to read -- the metal element --

Signed and Sealed this
Twenty-first Day of June, 2022

Katherine Kelly Vidal
*Director of the United States Patent and Trademark Office*